United States Patent [19]
Kaneshige

[11] Patent Number: 5,848,216

[45] Date of Patent: Dec. 8, 1998

[54] MEDIUM, APPARATUS AND METHOD FOR RECORDING AND REPRODUCING SELECTIVELY REPRODUCIBLE SCENES

[75] Inventor: Toshihiko Kaneshige, Kanagawa-ken, Japan

[73] Assignee: Kabushiki Kaisha Toshiba, Kawasaki, Japan

[21] Appl. No.: 604,335

[22] Filed: Feb. 21, 1996

[30] Foreign Application Priority Data

Feb. 22, 1995 [JP] Japan ..................................... 7-033981

[51] Int. Cl.⁶ .............................. H04N 5/91; H04N 5/93
[52] U.S. Cl. ................................. 386/46; 386/52
[58] Field of Search ................................. 358/335, 310, 358/342; 360/33.1, 13; 348/390, 420; 386/109, 111, 112, 46, 92, 96, 52; H04N 5/76, 5/91, 5/93

[56] References Cited

U.S. PATENT DOCUMENTS

| 4,305,131 | 12/1981 | Best . |
| 4,333,152 | 6/1982 | Best . |
| 4,569,026 | 2/1986 | Best . |
| 4,703,369 | 10/1987 | Moriyama . |
| 4,766,541 | 8/1988 | Bleich . |
| 4,777,537 | 10/1988 | Ueno . |
| 4,779,252 | 10/1988 | Custers . |
| 4,791,622 | 12/1988 | Clay . |
| 4,873,585 | 10/1989 | Blanton . |
| 4,876,719 | 10/1989 | Nakagami . |
| 4,930,160 | 5/1990 | Vogel . |

(List continued on next page.)

FOREIGN PATENT DOCUMENTS

| 60095759 | 5/1985 | European Pat. Off. . |
| 245904 | 11/1987 | European Pat. Off. . |
| 406021 | 1/1991 | European Pat. Off. . |
| 0 521 487 A1 | 1/1993 | European Pat. Off. . |
| 0 618 695 A2 | 10/1994 | European Pat. Off. . |
| 0 677 842 A1 | 10/1995 | European Pat. Off. . |
| 675493 | 10/1995 | European Pat. Off. . |
| 677842 | 10/1995 | European Pat. Off. . |
| 0 685 845 A2 | 12/1995 | European Pat. Off. . |
| 93923665 | 8/1996 | European Pat. Off. . |
| 1-221072 | 9/1989 | Japan . |
| 1-241083 | 9/1989 | Japan . |
| 1-273275 | 11/1989 | Japan . |
| 2-189780 | 7/1990 | Japan . |
| 2-202766 | 8/1990 | Japan . |
| 2-276071 | 11/1990 | Japan . |
| 3-293873 | 12/1991 | Japan . |
| 4-28056 | 1/1992 | Japan . |
| 4-440770 | 2/1992 | Japan . |
| 4212768 | 8/1992 | Japan . |
| 4324165 | 11/1992 | Japan . |
| 5189872 | 7/1993 | Japan . |
| 6-268954 | 9/1994 | Japan . |
| 7130102 | 5/1995 | Japan . |
| 7176175 | 7/1995 | Japan . |
| 7272445 | 10/1995 | Japan . |
| 7284060 | 10/1995 | Japan . |
| 2 229 889 A | 10/1990 | United Kingdom . |
| 2 260 463 A | 4/1993 | United Kingdom . |
| WO 83/02839 | 8/1983 | WIPO . |
| WO 86/01063 | 2/1986 | WIPO . |

OTHER PUBLICATIONS

Patent Abstracts of Japan, vol. 9, No. 243, May 1985.

*Primary Examiner*—Robert Chevalier
*Attorney, Agent, or Firm*—Cushman, Darby & Cushman IP Group of Pillsbury Madison & Sutro LLP

[57] ABSTRACT

In a data recording method according to first aspect of the present invention for recording on a recording medium a video program containing multi-scene zone having a selectively reproducible scene is characterized in that, a set of small scene blocks each having prescribed number of videoframes is obtained by dividing standard and option scenes in the multi-scene zone, and the scene blocks of the standard and option scenes in the same order are combined together and recorded on the recording medium.

46 Claims, 6 Drawing Sheets

U.S. PATENT DOCUMENTS

| | | |
|---|---|---|
| 5,101,364 | 3/1992 | Davenport . |
| 5,140,437 | 8/1992 | Yonemitsu et al. ............... 358/335 |
| 5,161,034 | 11/1992 | Klappert . |
| 5,218,454 | 6/1993 | Nagawasa . |
| 5,218,672 | 6/1993 | Morgan . |
| 5,225,904 | 7/1993 | Golin . |
| 5,243,582 | 9/1993 | Yamauchi . |
| 5,245,600 | 9/1993 | Yamauchi . |
| 5,253,120 | 10/1993 | Endoh . |
| 5,282,186 | 1/1994 | Yoshio . |
| 5,355,229 | 10/1994 | Arano . |
| 5,388,093 | 2/1995 | Yoshida . |
| 5,390,158 | 2/1995 | Furuhashi . |
| 5,396,374 | 3/1995 | Kubota . |
| 5,400,077 | 3/1995 | Cookson . |
| 5,420,839 | 5/1995 | Tateishi . |
| 5,424,850 | 6/1995 | Inoue . |
| 5,434,678 | 7/1995 | Abecassis ............................ 358/335 |
| 5,450,209 | 9/1995 | Niimura . |
| 5,465,240 | 11/1995 | Mankovitz . |
| 5,497,241 | 3/1996 | Ostrover et al. .................... 358/342 |
| 5,508,816 | 4/1996 | Ueda . |
| 5,513,010 | 4/1996 | Kori . |
| 5,519,681 | 5/1996 | Maeda . |
| 5,528,569 | 6/1996 | Fujiie . |
| 5,535,008 | 7/1996 | Yamagishi . |
| 5,543,925 | 8/1996 | Timmermans . |
| 5,546,368 | 8/1996 | Lee . |
| 5,561,649 | 10/1996 | Lee . |

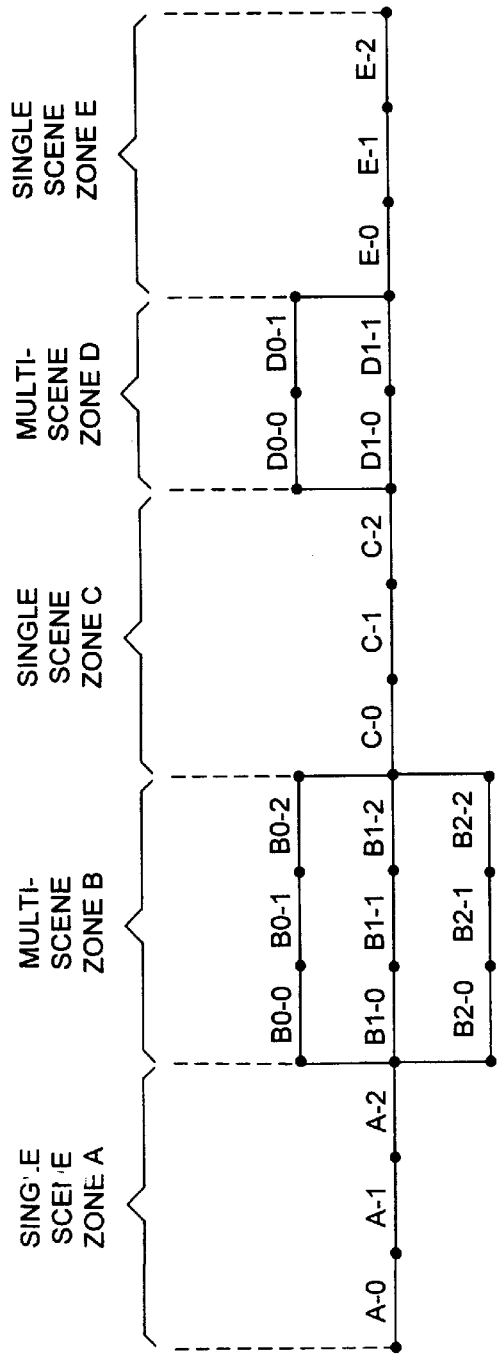
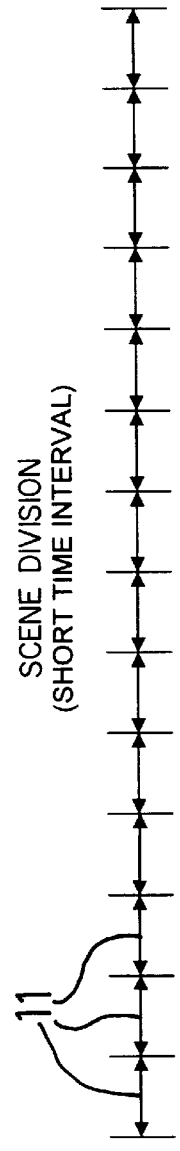
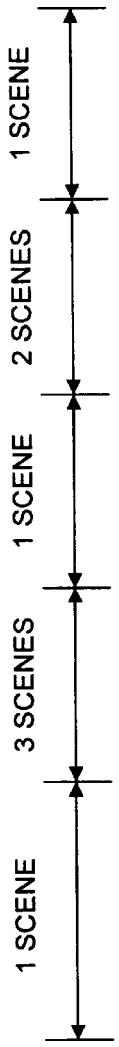
FIG.1(a)
FIG.1(b)
FIG.1(c)

MEDIUM, APPARATUS AND METHOD FOR RECORDING AND REPRODUCING SELECTIVELY REPRODUCIBLE SCENES

FIELD OF THE INVENTION

The present invention relates to a data recording method, a data recording medium, a data reproducing method and a data reproducing apparatus for recording and reproducing video/audio data to/from recording medium such as video discs.

BACKGROUND OF THE INVENTION

According to the recent developments in data compression techniques and multiple recording techniques, a high density recording of video/audio data on recording medium such as optical discs have been greatly progressed. However, in conventional reproducing apparatus, e.g., video disc players, the more data quantity in the recording medium becomes large, the more the reproducing apparatus needs much time for its reproduction process thus making the high quality reproduction of the recording medium difficult.

Referring now to FIG. 4, a video program containing multi-scenes in conventional technique will be explained. FIG. 4 shows the sequence of a video program containing multi-scenes. In FIG. 4, reference symbols A through E represent scene zones. For instance, the reference symbols B and D illustrate multi-scene zones. Further, the suffix "n" such as "0", "1", "2", etc. attached to the reference symbols shows a standard scene or any option scene in a multi-scene zone in the video program, as described later in detail.

For instance, a scene B0 within the multi-scene zone B represents the standard scene, while a first option scene B1 is a scene viewed from another camera angle different from that of the standard scene B0. Further, a second option scene B2 is scene viewed from still another camera angle different from the those of the standard scene B0 and the first option scene B0.

Referring now to FIG. 5, a conventional recording method for recording on a recording medium, e.g., an optical disc a video program containing such a multi-scene zone will be explained. FIG. 5 shows a data sequence in the video program to be recorded on an optical disc.

Video data of the first scene A of the video program is converted into prescribed digital signals together with its accompanying audio data, thus digital video/audio data being obtained. The digital video/audio data of the first scene A is reduced its data quantity by being applied with a prescribed data compressing process. In the same manner, compressed digital video/audio data of the other scenes B0 through E have been obtained.

These compressed digital video/audio data are recorded on an optical disc in the sequence of scenes A, B0, B1, B2, C, D0, D1 and E according to a prescribed recording format, as shown in FIG. 5. Further, in addition to compressed digital video/audio data, supplemental data representing their attributes, for instance, data indicating whether the scene in interest is of a multi-scene or not, the sequential code of the scene, the time code for indicating the elapsed time of the scene in reproduction, etc.

Referring again to FIG. 5, a method for reproducing from an optical disc a video program containing some multi-scene zones by a video disc player will be explained hereinafter.

When an instruction for starting the reproduction is made through an operating key of the video disc player in a standard reproduction mode where there is no selection for a prescribed option scene in the multi-scene zone, scenes A, B0, C, D0 and E of the recorded video data, as shown in FIG. 5, are reproduced in that order.

Accordingly, in this standard reproduction case, the reproduction starts from the beginning of scene A. When the reproduction of scene A is completed, the reproduction of scene B0 immediately follows the reproduction of scene A.

Here, it is assumed that the first option scene B1 is selected through the operating key after "n" seconds have elapsed in the reproduction of the standard scene B0 in the multi-scene zone B.

In this case, the video disc player immediately computes the elapsed time in the reproduction of the standard scene B0 for locating or searching the stating position of the selected first option scene B1 at the selection being made. Further, during the period of starting the actual reproduction of the first option scene B1 after its selection the standard scene B0 is successively displayed by a suitable manner, e.g., by temporarily storing the video data of the standard scene B0 in a buffer memory. When much time is required until the starting the reproduction of the selected first option scene B1 thus the video data of the standard scene B0 stored in the buffer memory was lost, the last video data of the standard scene B0 stored in the buffer memory is displayed as a still picture.

When the reproduction of the selected first option scene B1 completes, the video disc player immediately searches the beginning of scene C to jump into the reproduction of the scene C. Further, in the period until the actual reproduction of the scene C, the video data of the previous scene, i.e., the first option scene B1 stored in the buffer memory is successively displayed. When much time is required until the starting the reproduction of the scene C thus the video data of the option scene B0 stored in the buffer memory was lost, the last video data of the standard scene B0 stored in the buffer memory is also displayed as a still picture. Thereafter, the remaining scenes from D to E are reproduced in the same manner.

By the way, video programs that are reproduced by a video disc player are of dynamic images such as movie pictures in many cases and thus a continuity of story is of importance.

Therefore, when a user desires to select the reproduction of any option scene, e.g., the first option scene B1 during the reproduction of the standard scene B0, it is desirable for the user that the reproduction of the first option scene B1 quickly starts from its starting position responding to the elapsed time position of the previously reproduced standard scene B0. Further, when the reproduction of a different option scene, e.g., the second option scene B2 is selected by users, it is also desirable that the reproduction of the second option scene B2 quickly starts. This is also true in reproductions of standard and option scenes D0, D1 in the multi-scene zone D and so forth.

However, the conventional video disc player requires too much quantity of data to be stored in the buffer memory. In particular, when reproductions of option scenes are selected during reproduction of any scene in a multi-scene zone, a long time is required for computing the elapsed time of reproduction at the previous scene to locate or search the starting position of the selected option scene. Further, when much time is required until the starting the reproduction of the selected option scene, the last video data of the previous scene stored in the buffer memory is displayed as a still picture, but impairs the continuity of the video program.

In case of the conventional data recording method as described above, there is such a problem that in case of a reproduction of an option scene being selected during a reproduction of any scene in a multi-scene zone, a long time lag occurs for switching the scene to the selected option scene by computing the elapsed time in the previous scene to locate or search the starting position of the selected option scene, thus impairing the continuity of the video program. Furthermore, when the scene change is frequently carried out, the problem will become more serious.

SUMMARY OF THE INVENTION

It is, therefore, an object of the present invention to provide a data recording method, a recording medium, a data reproducing method and a data reproducing apparatus capable of quickly performing scene changes in a multi-scene program.

In order to achieve the above object, in a data recording method according to first aspect of the present invention for recording on a recording medium a video program containing multi-scene zone having a selectively reproducible scene is characterized in that, a set of small scene blocks each having prescribed number of video-frames is obtained by dividing standard and option scenes in the multi-scene zone, and the scene blocks of the standard and option scenes in the same order are combined together and recorded on the recording medium.

In a data recording method according to second aspect of the present invention for recording on a recording medium a video program containing multi-scene zone having a selectively reproducible scene is characterized in that, a set of small scene blocks each having a prescribed number of video-frames is obtained by dividing video data of standard and option scenes of the multi-scene zone, and after applying a prescribed compressing process to each of the scene blocks and the scene blocks of the standard and option scenes in the same order are combined together.

In a data recording method according to third aspect of the present invention, the data compression ratio of the scene blocks is so controlled that the total data quantity of the set of combined scene blocks having the same order does not exceed a prescribed value.

In a data recording medium according to fourth aspect of the present invention for recording a video program containing multi-scene zone having a selectively reproducible scene, standard and option scenes in the multi-scene zone are divided into a set of scene blocks each having a prescribed number of video-frames, and the scene blocks having the same order within the standard and option scenes are combined together.

In a recording medium according to fifth aspect of the present invention for recording a video program containing multi-scene zone having a selectively reproducible scene, standard and option scenes of the multi-scene zone are divided into a set of scene blocks each having a prescribed number of video-frames, applied with a prescribed data compression process, and the scene blocks having the same order within are combined together.

In a recording medium according to sixth aspect of the present invention for reproducing from a recording medium a video program containing multi-scene zone having a selectively reproducible scene, the video program being so recorded that the scenes are divided into a set of scene blocks each having a prescribed number of video-frames and thus the scene blocks having the same order within the standard and option scenes are combined together is characterized in that, video data recorded on the recording medium are read in the sequence of the scene blocks, a set of scene block having the same order is stored in a storage means, and when an option scene is selected during the reproduction of the multi-scene zone, a scene block corresponding to the selected scene is read out of the storage means and reproduced.

In a data reproducing method according to seventh aspect of the present invention for reproducing from a recording medium a video program containing multi-scene zone having a selectively reproducible scene, the video program being so recorded that the scenes are divided into a set of scene blocks each having a prescribed number of video-frames, thus the scene blocks having the same order within the standard and option scenes are combined together, and so processed with a prescribed data compression that the total data quantity of the set of combined scene blocks does not exceed a prescribed value is characterized, compressed video data recorded on the recording medium are read out in the sequence of the scene blocks, the scene blocks having the same order in the reproduced compressed video data are stored in a storage means, and when an option scene is selected during the reproduction of the multi-scene zone a scene block of the selected option scene at the time of the selection is read out from the storage means and reproduced with a data expansion process oppositely responding to the data compression process applied in the recording operation.

In a data reproducing apparatus according to eighth aspect of the present invention for reproducing from a recording medium a video program containing multi-scene zone having a selectively reproducible scene, the video program being so recorded that the scenes are divided into a set of scene blocks each having a prescribed number of video-frames and thus the scene blocks having the same order within the standard and option scenes are combined together, it includes reproducing means for reproducing from the recording medium the video data for every set of the combined scene blocks, storage means for storing the set of scene blocks read out by the reproducing means, and reading means for reading out from the storage means a selected scene block at the time of the selection when an option scene is selected during the reproduction of a multi-scene zone.

In a data reproducing apparatus according to ninth aspect of the present invention for reproducing from a recording medium a video program containing multi-scene zone having a selectively reproducible scene, the video program being so recorded that the scenes are divided into a set of scene blocks each having a prescribed number of video-frames, thus the scene blocks having the same order within the standard and option scenes are combined together, and also the total data quantity of the set of combined scene blocks does not exceed a prescribed value, it includes reproducing means for reproducing from the recording medium the video data for every set of the combined scene blocks, storage means for storing the set of scene blocks read out by the reproducing means, and reading means for reading out from the storage means a selected scene block at the time of the selection with a data expansion process oppositely responding to the data compression process applied in the recording operation when an option scene is selected during the reproduction of a multi-scene zone.

In the present invention, standard and option scenes in a multi-scene zone contained in a video program are divided into a set of scene block having a prescribed number of video frames. Then scene blocks having the same order of the standard and option scenes are combined together and thus recorded on a recording medium in the sequence of the scene blocks. The video program thus recorded on a recording medium is reproduced by a data reproducing apparatus. In the data reproducing apparatus, a set of scene blocks having the same order is reproduced from the recording medium and then stored in a storage means of the apparatus.

Therefore, when an option scene is selected by user through the operation key during the reproduction of the multi-scene zone, a scene block in the order responding the time of the key operation is quickly read out from the storage means and the selected option scene is quickly reproduced.

Thus, so long time required in the conventional system for computing the elapsed time in reproduction of previous scene to locate or search the stating position of the selected scene is reduced and thus the scene change is made without any serious time lag.

As a result, even when a scene change is instructed during reproduction of multi-scene zone contained in a video program, the scene change can be quickly carried out.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1(a) is a diagram showing the sequence of a video program containing multi-scenes;

FIG. 1(b) is a diagram showing a scene blocks each having a predetermined number of video frames to divide each scene video data;

FIG. 1(c) is a diagram showing the number of multi-scenes in each scene;

DESCRIPTION OF THE PREFERRED EMBODIMENTS

Figure 6:
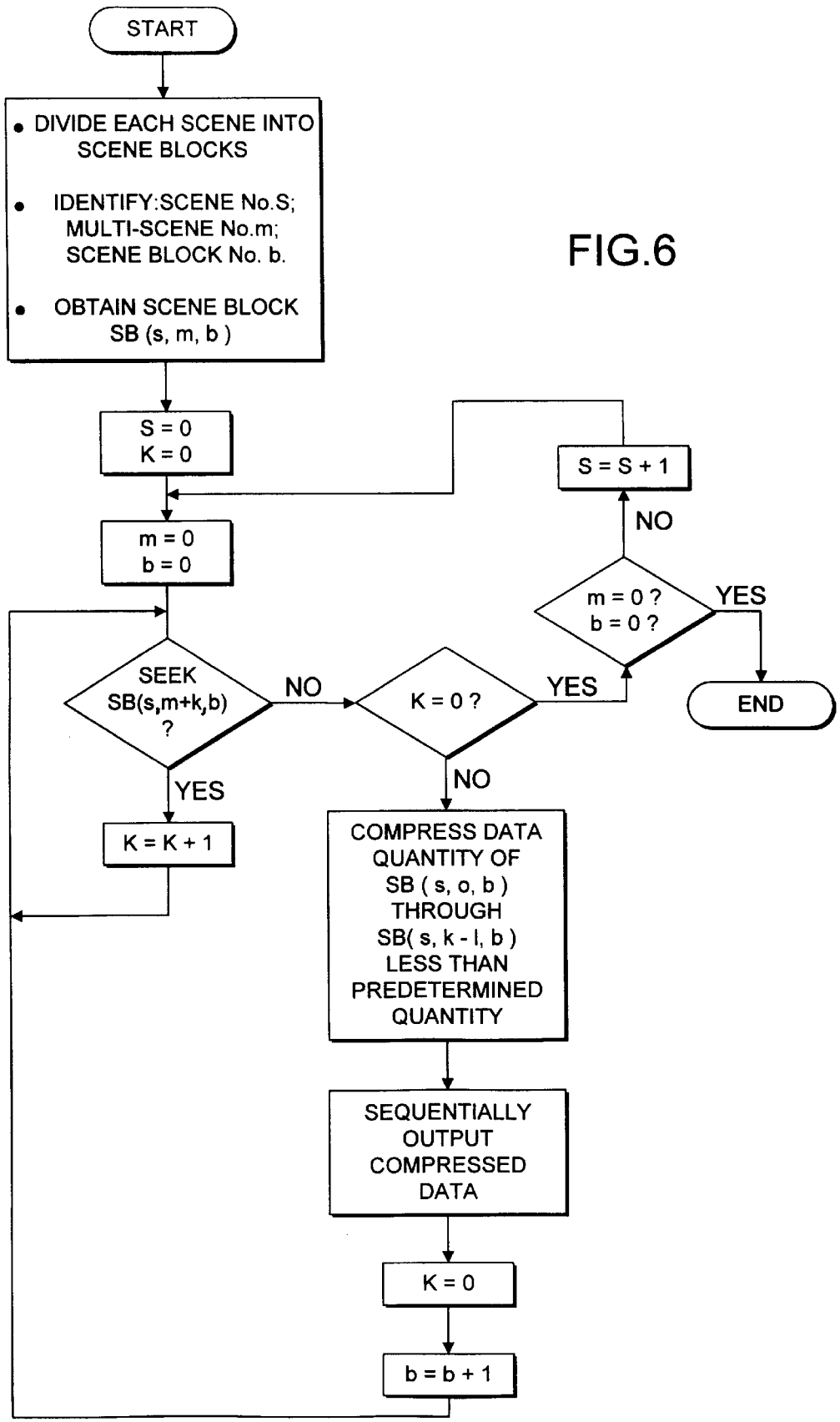
FIG. 6 is a flow-chart showing the data recording routine into a recording medium according to the present invention.
Figure 7:
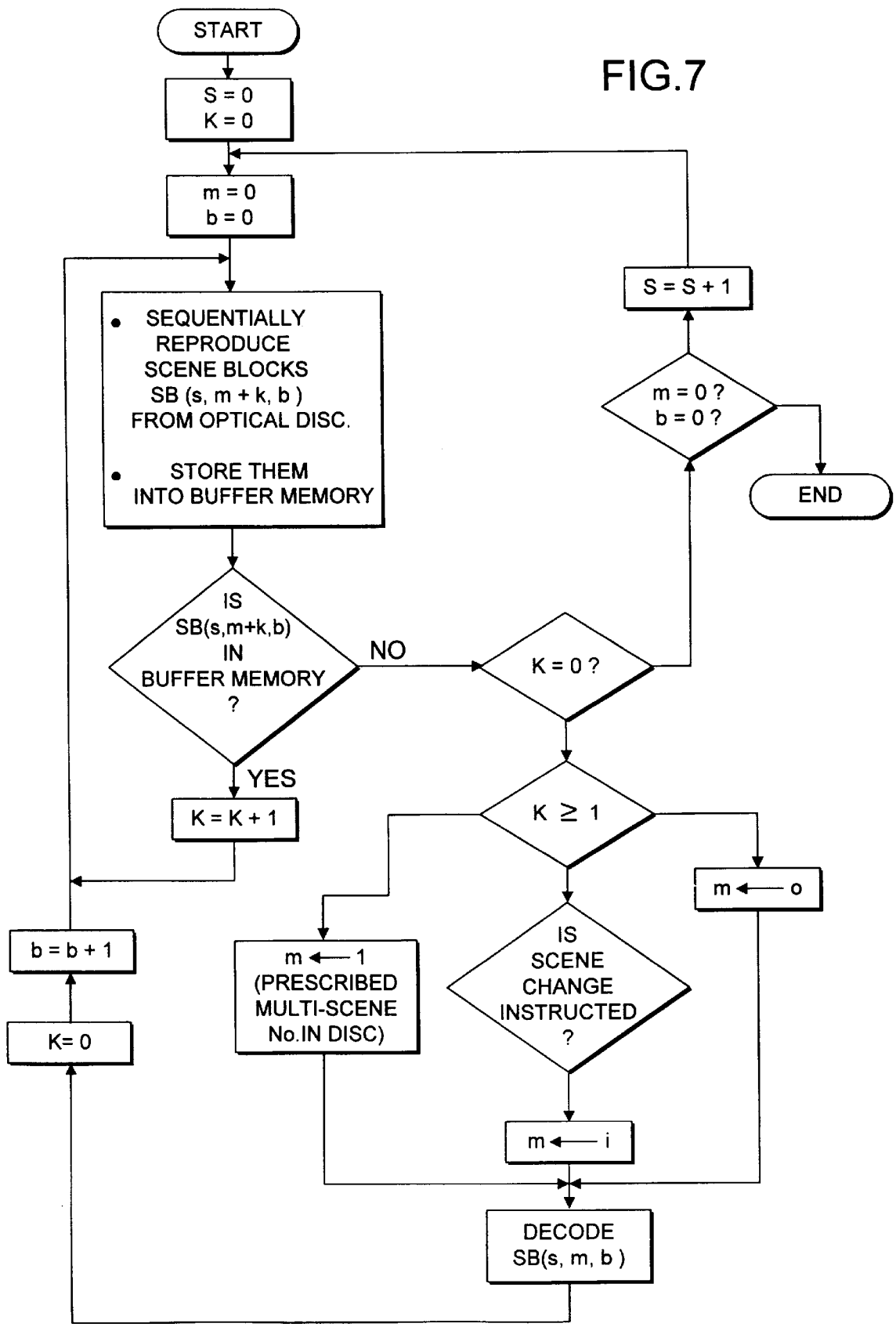
FIG. 7 is a flow-chart showing the data reproducing routine from a recording medium according to the present invention.

Hereinafter, a preferred embodiment of the present invention will be described in reference to the attached drawings, FIGS. 1 through 3 and further to FIGS. 6 and 7.

In the drawings, FIG. 1(a) shows the sequence of scenes in a video program containing multi-scenes. While FIG. 1(b) shows a data sequence of the video program wherein the scenes are divided into small scene blocks each having a prescribed number of video frames. Further FIG. 1(c) represents the numbers of the multi-scenes in the scenes A, B . . . E of the video program.

As shown in FIG. 1(a), a video program is sequentially constructed so that scenes A, B . . . E can be reproduced in their order. The scene zone B contains three different scenes, i.e., a standard scene B0 and two option scenes B1 and B2.

In reproduction of the video program the standard scene B0 automatically follows the reproduction of the previous scene A when no scene change is instructed, while any one of the option scenes B1 and B2 is selectively reproducible in place of the standard scene B0 when a scene change designating the option scene B1 or B2 is instructed. The reproduction time intervals for the scenes A, B . . . E are set in a uniform length.

Each of the scenes is further divided into scene blocks each having a predetermined number of video frames 11, as shown in FIG. 1(b). For instance, the first scene A is divided into three scenes; the scenes A-0, A-1 and A-2 for every prescribed reproducible number of video frames at the scene blocks each having a predetermined number of video frames.

Further, the zones A, B . . . E contain the units of scenes, as shown in FIG. 1(c). For instance, the multi-scene zone B contains 3 units of scenes, i.e., three scenes B0, B1 and B2 which are allocated in parallel in the same time domain. The scene B0 being designated as a standard scene is automatically put in reproduction following the previous scene A. However, the other scenes B1 and B2 designated as option scenes are put in reproduction in place of the standard scene B0 only when they are intentionally selected through an operation key by users.

Each of the above three scenes B0, B1 and B2 is further divided into a set of short time blocks, i.e., small scene blocks each having a predetermined number of video frames 11. For example, the standard scene B0 is divided into three small scene blocks B0-0, B0-1 and B0-2. The first option scene B1 is also divided into three small scene blocks B1-0, B1-1 and B1-2. The second option scene B2 is still also divided into three small scene blocks B2-0, B2-1 and B2-2. Similarly, the scenes C through E are divided into three small scene blocks.

Hereinafter, a recording method of a video program which is constructed with the scenes divided into small scene blocks, as described above, will be explained.

Each scene block is converted into prescribed digital signals together with audio information accompanied, thus resulting a digital video/audio data unit block. the digital video/audio data unit block is operated with a prescribed data compression process, thus resulting a compressed digital video/audio data unit block.

Further, an irreversible entropy coding technique is used for the data compressing process. According to the entropy coding technique, the data quantity of the scene block operated with the data compression process varies in dependent on an image pattern of the video data before processing the data compression and is also irreversible. Thus, it is possible to decrease the data quantity after the data compression process. Such the data compression technique has been known as, for instance, the MPEG (Motion Picture Experts Group) technique.

Figure 2A:
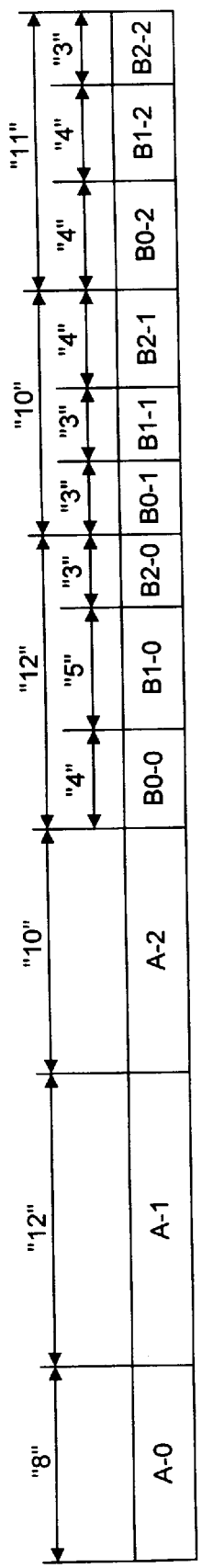
FIGS. 2(a), 2(b) and 2(c), are diagrams showing the contents of compression data to be recorded on an optical disc.
Figure 2B:
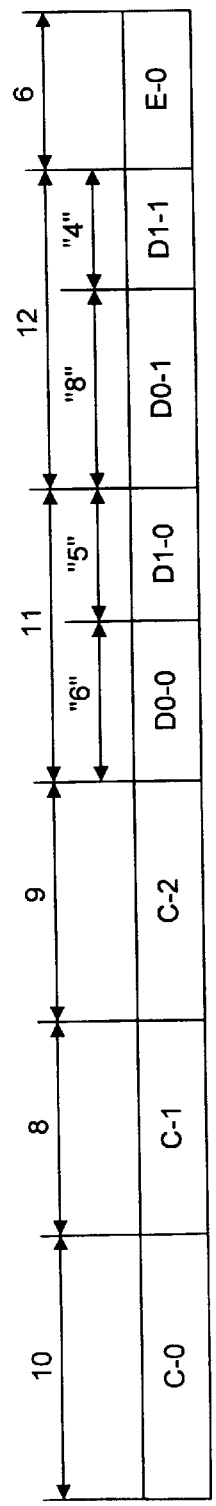
Figure 2C:
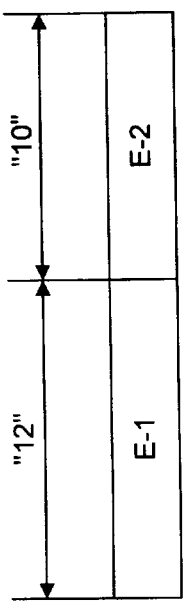

FIGS. 2(a), 2(b) and 2(c) show the data sequence of the video signal to be recorded on a recording medium such as an optical disc 1. On the optical disc 1, the compressed digital video/audio data unit block after the prescribed data compression process is recorded according to a prescribed recording format, as shown in FIGS. 2(a), 2(b) and 2(c). Further, in addition to the compressed digital video/audio data, supplemental data showing their attributes, for instance, data indication whether the scene in interest is of a multi-scene or not, the sequential code of the scene, the time code for indicating the elapsed time of the scene in reproduction, etc.

In the compressing process before recording on the optical disc 1, each digital video/audio data unit block is decreased its data quantity, thus resulting a compressed digital video/audio data unit block.

That is, each of the scenes A, C, E which is comprised of single scene is so compressed that the digital video/audio data unit block becomes to the data quantity of "12" (dimensionless quantity) in its maximum. For instance, the first scene block A-0 in the scene zone A becomes to the data quantity of "8" after the compression. The second scene block A-1 of the scene A becomes to the data quantity of "12" after the compression. Also the third scene block A-2 of the scene A becomes to the data quantity of "10" after the compression.

Further, each of the multi-scene zones B, D which comprise two scenes or more is so compressed that the digital video/audio data unit block becomes to the data quantity "12" (dimensionless quantity) in its maximum.

For instance, the first order scene blocks B0-0, B1-0 and B2-0 of the standard scene B0 and the first and second option scenes B1, B2 become to the data quantitys of "4", "5" and "3" (dimensionless quantity) in maximum, respectively. Thus, their total data quantity of the first order scene blocks is compressed to the quantity of "12" (dimensionless quantity) or less.

According to such data compressions the digital video/audio data unit blocks in respective scenes are reduced their total data quantity to the quantity of "12" or less, as set in accordance with the above-described requirement.

The data arrangement of the recording video data on the optical disc 1 will be explained hereafter.

First scene zone A comprising single scene is divided into three scene blocks A-0, A-1 and A-2. The scene blocks of the scene A are arranged in the sequence of the scene blocks to be taken in the reproduction process, that is, in the sequence of the scene blocks A-0, A-1 and A-2.

The multi-scene zone B following the scene A is comprised of three different scenes, i.e., a standard scene B0, a first option scene B1 and a second scene B2. Each of the scenes is divided into three scene blocks each having a predetermined number of video frames 11. For instance, the standard scene B0 is comprised of the scene blocks B0-1, B0-2 and B0-3. Here, the suffixes -1, -2 and -3 represent the sequential orders of the scene blocks.

Then, the scene blocks B0-0, B1-0 and B2-0, which are the first compression digital video/audio data unit blocks of the scenes B0, B1 and B2 are respectively arranged in the sequence thereof. The scene blocks B0-1, B3-1 and B2-1, which are the second compression digital video/audio data unit blocks of the scenes B0, B1 and B2 are respectively arranged in the sequence thereof. And also the scene blocks B0-2, B1-2 and B2-2, which are the third compression digital video/audio data unit blocks of the scenes B0, B1 and B2 are respectively arranged in the sequence thereof.

That is, in the multi-scene zones, individual scene blocks of the same order in the standard and option scenes are combined together for every short time interval and then recorded sequentially.

Next, in the scene zone C following the multi-scene zone B it is comprised of single scene, in similar to the scene A. The scene C is also divided into three scene blocks C-0, C-1 and C-2. The scene blocks of the scene C are arranged in the sequence of the scene blocks to be taken in the reproduction process, that is, in the sequence of the scene blocks C-0, C-1 and C-2. In the multi-scene zone D following the scene C, it is comprised of two different scenes, i.e., a standard scene D0 and an option scene D1. Each of the scenes is also divided into three scene blocks each having a predetermined number of video frames 11. For instance, the standard scene D0 is comprised of the scene blocks D0-1, D0-2 and D0-3. Then, the scene blocks D0-0 and D1-0, which are the first compression digital video/audio data unit blocks of the scenes D0 and D1 are respectively arranged in the sequence thereof. And also the scene blocks D0-1 and D1-1, which are the second compression digital video/audio data unit blocks of the scenes D0 and D1 are respectively arranged in the sequence thereof. The scene zone E following the multi-scene zone D is comprised of single scene, in similar to the scenes A and C. The scene E is also divided into three scene blocks E-0, E-1 and E-2. The scene blocks of the scene E are arranged in the sequence of the scene blocks to be taken in the reproduction process, that is, in the sequence of the scene blocks E-0, E-1 and E-2. FIG. 6 shows the recording routine into a recording medium such as an optical disc player according to the present invention.

Referring now to FIG. 3, a reproducing apparatus according to the present invention, such as a video disc player, for reproducing the video program recorded on the optical disc as described above will be explained FIG. 3 shows the circuit arrangement of the video disc player in one embodiment of the present invention. In FIG. 3, the reference numeral 1 denotes an optical disc such as a video disc or a laser disc. The reference numeral 2 denotes a disc reproduction signal processor which receives the recorded signal reproduced by an optical pickup (not shown) from the optical disc 1. The disc reproduction signal processor 2 then carries out a waveform shaping on the reproduced signals and a clock extraction from the reproduced signals, thus outputting a prescribed digital reproduction signal. The reference numeral 3 denotes a digital signal processor which carries out a prescribed demodulation process and an error correction process on the digital reproduction signals from the disc reproduction signal processor 2. A compression digital video/audio data thus obtained by the digital signal processor 3 is temporarily stored in a buffer memory 4 (storage means). The compression digital video/audio data stored in the buffer memory 4 is separated to a video data and an audio data. The reference numeral 5 denotes a video processor which carries out a prescribed data expansion process on the compression video data provided from the digital signal processor 3 through the buffer memory 4, thus outputting a video signal. The reference numeral 6 denotes an audio processor which also carries out another prescribed data expansion process on the compression audio data provided from the digital signal processor 3 through the buffer memory 4, thus outputting an audio signal. The reference numeral 7 denotes an operating key which can be operated by users. The reference numeral 8 denotes a disc system controller which controls the rotation of the optical disc 1 and the optical pickup, based on prescribed signals provided from the disc reproduction signal processor 2 and an MPU (microprocessor unit) 9. The MPU 9 generates a prescribed control signal for the signal processing systems and the disc system controller 8 based on an operation instruction which is given through the operating key 7. The MPU 9 also receives prescribed signals from other circuit elements in the video disc player when necessary. The video disc player has an ability of reproducing compression data of quantity 12 at the maximum in the short time interval as described above.

Figure 3:
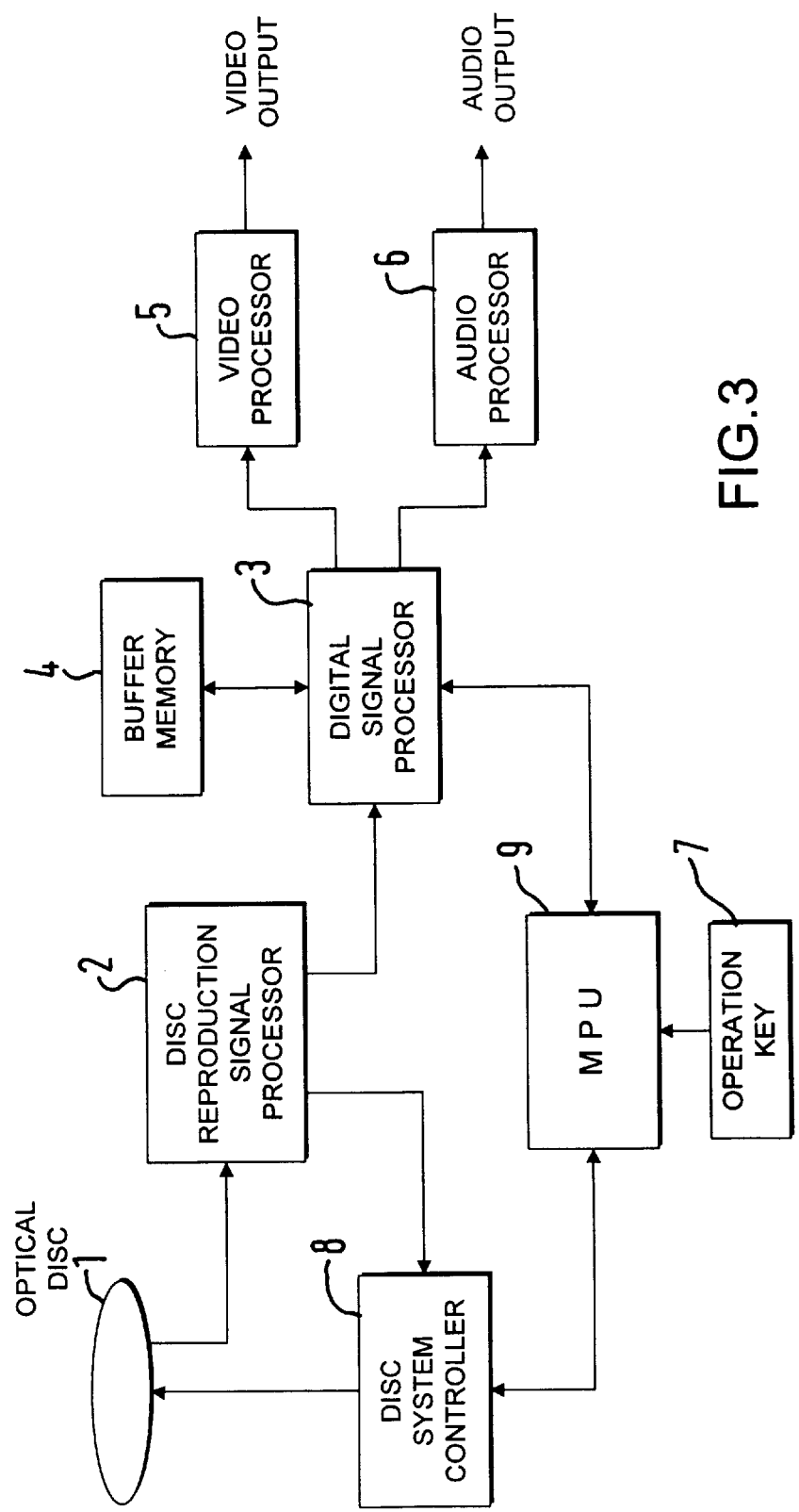
FIG. 3 is a diagram showing the construction of a video disc player involved in one embodiment of the present invention.
Figure 4:
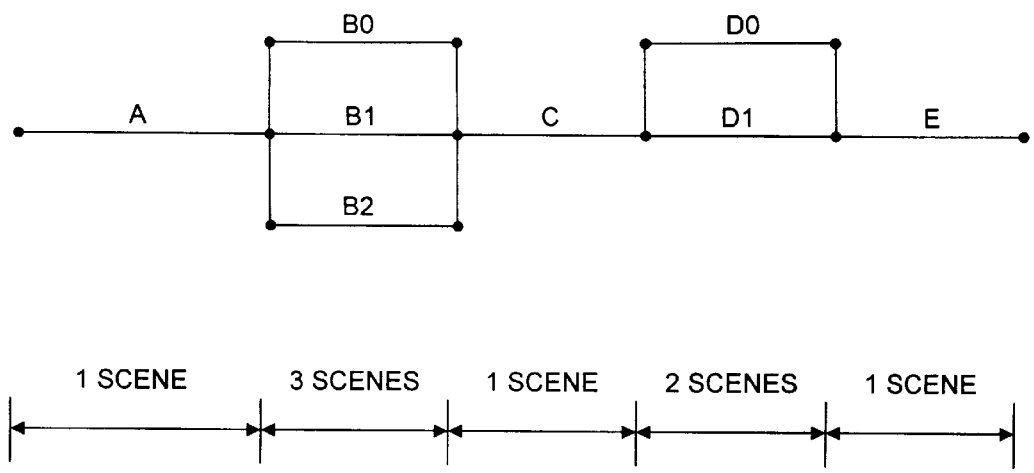
FIG. 4 is a diagram showing the sequence of a video program containing conventional multi-scenes.
Figure 5:
FIG. 5 is a diagram showing conventional data record contents.

The operation of the video disc player, as shown in FIG. 3, will be described hereinafter.

When the instruction to start the reproduction is input to the video disc player by the operating key 7, signals recorded on the optical disc 1 are read by the optical pickup (not shown) and input to the disc reproduction processor 2. After the waveform shaping of reproduction signals and the extraction of reproduction clock, prescribed digital reproduction signals are obtained in the disc reproduction signal processor 2 and the reproduction signals are input to the digital signal processor 3. In the digital signal processor 3, the prescribed demodulation process and the error correction process of the digital reproduction signals are carried out and compression data (compression digital video/audio data) is obtained. the compression data is once stored in the buffer memory 4. The compression digital video/audio data for one short time interval stored in the buffer memory 4 is separated into video data and audio data for every scene block and output to the video processor 5 and the audio processor 6, respectively. The video processor 5 expands its input compression video data to the original data quantity according to a prescribed data expansion processing technique. Also the audio processor 6 expands its input compression audio data to the original data quantity according to another prescribed data expansion processing technique. Thus a video signal and an audio signal synchronized with the video signal are obtained by the video disc player.

According to the operations carried out in the video disc player, first the video data of the scene A is reproduced staring from its first scene block A-0. Then the reproductions of the scene blocks A-1 and A-2 follow that of the scene block A-0.

Then, in the reproduction of the multi-scene zone B, the compression data set of the first scene blocks B0-0, B1-0 and B2-0 in the standard and option scenes B0, B1 and B2 is reproduced in that order of scene blocks B0-0, B1-0 and B2-0.

Here, the scene block B0-0 has the data quantity of "4". While the scene block B1-0 has the data quantity of "5". Similarly, the scene block B2-0 has the data quantity of "3". Then, their total data quantity becomes "12".

The compression data set of the first scene blocks B0-0, B1-0 and B2-0 is temporarily stored into the buffer memory 4.

When any scene change is not instructed in the reproduction of the multi-scenes (standard reproduction mode), only the compression data of the first order scene block B0-0 of the standard scene B0 is read out from the buffer memory 4. Then the compression data of the scene block B0-0 is carried out the prescribed data expansion processes in the video processor 5 and the audio processor 6, thus the expanded video/audio data unit block of the scene block B0-0 is obtained in one short time interval. Then the reproduction of the standard scene B0 is carried out starting from the first order scene block B0-0. While, when the scene change designating any of the option scenes B1 and B2 is instructed, the compression data of the first order scene block B1-0 or B2-0 of the selected option scene B1 or B2 is read out from the buffer memory 4 instead of that of the standard scene B0. Then the data of the scene block B1-0 or B2-0 is carried out the prescribed data expansion processes in the video processor 5 and the audio processor 6, thus the expanded video/audio data unit block of the scene block B1-0 or B2-0 is obtained in one short time interval. Then the reproduction of the selected option scene B1 or B2 is carried out starting from its first order scene block B1-0 or B2-0.

Following the multi-scene zone B, the reproduction of the second single scene zone C is carried out in the manner similar to the first single scene zone A. When the reproduction enters into the next multi-scene zone D, and therein the scene change is instructed in the manner similar to that in the previous multi-scene zone B, the compression data of the designated scene block, e.g., D1-0, is read out from the buffer memory 4 instead of the standard scene D0 in the same manner as described above. Thus the reproduction of the selected option scene D1 is carried out.

As described above, according to the video program recording and reproducing methods of the present invention, the scenes A through E of the video program are divided into short time intervals, i.e., small scene blocks each having a predetermined number of video frames 11. In particular, in the multi-scene zones B and D their scene blocks each having the same order in the standard scene and option scenes are combined together and then so compressed that the total data quantity of the set of the combined scene blocks does not exceed a prescribed value such as "12" (dimensionless quantity). Then the video program containing such a combined set of scene blocks is recorded on the optical disc 1. Therefore, during the reproduction of the video program from the optical disc 1 by video disc players, the compression data thus reproduced are temporarily stored in the buffer memory 4 in every data quantity not exceeding "12". In particular, in the standard reproduction mode where any scene change does not instructed in the multi-scene zones, the video data of each scene block is expanded oppositely responding to the data compression process carried out in the recording operation. Thus the video data of the standard scene are reproduced with their original data quantity.

When the scene change is instructed in the multi-scene zone, as the compression data of selected option scene has been stored in the buffer memory 4 for every short time interval, i.e., for the combined set of the scene blocks with the same sequential order, a desired scene block responding to the scene change timing is quickly read out from the buffer memory 4. Thus it is unnecessary to compute the elapsed time in the scene block reproduced prior to the selected option scene for locating or searching the starting position in the selected scene. This results to effectively reduce the waiting time until the actual change into the selected scene from the scene change operation. FIG. 7 shows the reproduction routine from the recording medium such as the optical disc player according to the present invention.

As a result, users are able to enjoy a fully comfortable video program.

As described above, the present invention is able to provide a data recording method, a recording medium, a data reproducing method and a data reproducing apparatus for recording and reproducing video/audio data to/from recording medium such as video disc, in which multi-scene zone data contained in a video program are divided into small scene blocks each having a prescribed number of video-frames, and then the scene blocks having the same order in the standard and option scenes are combined together, thus the combined set of same order scene blocks is recorded on the recording medium. In reproduction of the recording medium, the combined set of the same order scene blocks are stored together in the temporal storage means such as the buffer memory in the sequence of the short time intervals, i.e., in the sequence of the small scene blocks. Thus when the scene change is instructed during the reproduction of the multi-scene zone. the scene block of the selected option scene responding to the scene change timing is quickly read out from the storage means, i.e., the buffer memory.

Thus, such a long time required in the conventional system for computing the elapsed time of the other scene to locate or search the starting position in the selected option scene can be effectively reduced. That is the scene change is quickly effected with almost zero time lag. According to the present invention users are able to enjoy a fully comfortable video program.

As described above, the present invention can provide an extremely preferable data recording method, data recording medium, data reproducing method and data reproducing apparatus for recording and reproducing video/audio data to/from recording medium such as video discs.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A data recording method for recording a video program containing at least one multi-scene zone having a plurality of selectively reproducible scenes on a recording medium, the method including the steps of:

dividing each of the selectively reproducible scenes contained in a particular multi-scene zone to generate scene divisions;

generating a set of scene blocks based on the scene divisions, each scene block including a corresponding scene division from each selectively reproducible scene within the particular multi-scene zone, where the scene divisions within each scene block are multiplexed, and where each scene block has less than a prescribed quantity of video data regardless of a number of selectively reproducible scenes included in the particular multi-scene zone; and recording the scene block on the recording medium.

2. A data recording method for recording a video program containing at least one multi-scene zone having a plurality of selectively reproducible scenes on a recording medium, the method including the steps of:

dividing video data of each selectively reproducible scene within a particular multi-scene zone to generate scene divisions;

applying a prescribed compressing process to each of the scene divisions;

generating a set of scene blocks based on the compressed scene divisions, each scene block including a corresponding one of the compressed scene divisions from each selectively reproducible scene within the particular multi-scene zone, where the scene divisions within each scene block are multiplexed; and recording the scene blocks on the recording medium.

3. A data recording method as claimed in claim 2, where a data compression ratio used in the prescribed compressing process is controlled so that a total data quantity for each scene block does not exceed a prescribed value.

4. A recording medium recording a video program containing at least one multi-scene zone having a plurality of selectively reproducible scenes, where each selectively reproducible scene in a particular multi-scene zone is divided into a set of scene divisions, scene blocks being generated based on the scene divisions, each scene block including a corresponding scene division from each selectively reproducible scene within the particular multi-scene zone, where the scene divisions within each scene block are multiplexed, and where each scene block has less than a prescribed quantity of video data regardless of a number of selectively reproducible scenes within the particular multi-scene zone.

5. A recording medium recording a video program containing at least one multi-scene zone having a plurality of selectively reproducible scenes, where each selectively reproducible scene in a particular multi-scene zone is divided into a set of scene divisions, scene blocks being generated based on the scene divisions, each scene block including a corresponding scene division from each selectively reproducible scene within the particular multi-scene zone, where the scene divisions within each scene block are multiplexed, and where each scene division is subject to a prescribed data compression process.

6. A data reproducing method for reproducing from a recording medium a video program containing at least one multi-scene zone having a plurality of selectively reproducible scenes, the video program being recorded with each selectively reproducible scene in a particular multi-scene zone being divided into a set of scene divisions, a set of scene blocks being generated based on the scene divisions, each scene block including a corresponding scene division from each selectively reproducible scene within the particular multi-scene zone, where the scene divisions within each scene block are multiplexed, and where each scene block has less than a prescribed quantity of video data regardless of the number of selectively reproducible scenes within the particular multi-scene zone, the reproducing method including the steps of:

reading a particular scene block from the recording medium;

storing the particular scene block read from the recording medium; and reading and reproducing a scene division from the particular scene block corresponding to a selected one of the selectively reproducible scenes.

7. A data reproducing method for reproducing from a recording medium a video program containing at least one multi-scene zone having a plurality of selectively reproducible scenes, the video program being recorded with each selectively reproducible scene in a particular multi-scene zone being divided into a set of scene divisions, a set of scene blocks being generated based on the scene divisions, each scene block including a corresponding scene division from each selectively reproducible scene within the particular multi-scene zone, where the scene divisions within each scene block are multiplexed, each scene division being processed according to a prescribed data compression, the reproducing method including the steps of:

reading a particular scene block recorded on the recording medium;

storing the particular scene block read from the recording medium in a storage means;

reading from the storage means a particular scene division corresponding to a selected one of the selectively reproducible scenes; and reproducing the particular scene division read from the storage means using a data expansion process that is related to the data compression process applied in the recording operation.

8. A data reproducing apparatus for reproducing from a recording medium a video program containing at least one multi-scene zone having a plurality of selectively reproducible scenes, the video program being recorded with each selectively reproducible scene in a particular multi-scene zone being divided into a set of scene divisions, a set of scene blocks being generated based on the scene divisions, each scene block including a corresponding scene division from each selectively reproducible scene within the particular multi-scene zone, where the scene divisions within each scene block are multiplexed, and where each scene block has less than a prescribed quantity of video data regardless of the number of selectively reproducible scenes within the particular multi-scene zone, the data reproducing apparatus comprising:

reproducing means for reproducing from the recording medium a particular scene block;

storage means for storing the particular scene block reproduced by the reproducing means; and reading means for reading and recording a particular scene division corresponding to a selected one of the selectively reproducible scenes from the storage means.

9. A data reproducing apparatus for reproducing from a recording medium a video program containing at least one multi-scene zone having a plurality of selectively reproducible scenes, the video program being recorded with each selectively reproducible scene in a particular multi-scene zone being divided into a set of scene divisions, a set of scene blocks being generated based on the scene divisions, each scene block including a corresponding scene division from each selectively reproducible scene within the particular multi-scene zone, where the scene divisions within each scene block are multiplexed, each scene division being processed according to a prescribed data compression, the data reproducing apparatus comprising:

first reproducing means for reproducing from the recording medium a particular scene block;

storage means for storing the particular scene block reproduced by the first reproducing means;

reading means for reading from the storage means a particular scene division corresponding to a selected one of the selectively reproducible scenes with a data expansion process that is related to the data compression process applied in the recording operation; and second reproducing means for reproducing the particular scene division read from the storage means using a data expansion process that is related to the data compression process applied in the recording operation.

10. A data recording method for recording a video program containing at least one multi-scene zone having a plurality of selectively reproducible scenes on a recording medium, the method including the steps of:

dividing each of the selectively reproducible scenes contained in a particular multi-scene zone to generate scene divisions;

generating a set of scene blocks based on the scene divisions, each scene block including a corresponding scene division from each selectively reproducible scene within the particular multi-scene zone, where the scene divisions within each scene block are multiplexed, and where a quantity of video data in each scene division is inversely related to a number of selectively reproducible scenes included in the particular multi-scene zone; and recording the scene block on the recording medium.

11. A recording medium recording a video program containing at least one multi-scene zone having a plurality of selectively reproducible scenes, where each selectively reproducible scene in a particular multi-scene zone is divided into a set of scene divisions, scene blocks being generated based on the scene divisions, each scene block including a corresponding scene division from each selectively reproducible scene within the particular multi-scene zone, where the scene divisions within each scene block are multiplexed, and where a number of video frames in each scene division is inversely related to a number of selectively reproducible scenes included in the particular multi-scene.

12. A data reproducing method for reproducing from a recording medium a video program containing at least one multi-scene zone having a plurality of selectively reproducible scenes, the video program being recorded with each selectively reproducible scene in a particular multi-scene zone being divided into a set of scene divisions, a set of scene blocks being generated based on the scene divisions, each scene block including a corresponding scene division from each selectively reproducible scene within the particular multi-scene zone, where the scene divisions within each scene block are multiplexed, and where a quantity of video data in each scene division is inversely related to a number of selectively reproducible scenes included in the particular multi-scene zone, the reproducing method including the steps of:

reading a particular scene block from the recording medium;

storing the particular scene block read from the recording medium; and reading and reproducing from the storage means a scene division from the particular scene block corresponding to a selected one of the selectively reproducible scenes.

13. A data reproducing apparatus for reproducing from a recording medium a video program containing at least one multi-scene zone having a plurality of selectively reproducible scenes, the video program being recorded with each selectively reproducible scene in a particular multi-scene zone being divided into a set of scene divisions, a set of scene blocks being generated based on the scene divisions, each scene block including a corresponding scene division from each selectively reproducible scene within the particular multi-scene zone, where the scene divisions within each scene block are multiplexed, where a quantity of video data in each scene division is inversely related to a number of selectively reproducible scenes included in the particular multi-scene zone, the data reproducing apparatus comprising:

first reproducing means for reproducing from the recording medium a particular scene block;

storage means for storing the particular scene block reproduced by the first reproducing means;

reading means for reading from the storage means a particular scene division corresponding to a selected one of the selectively reproducible scenes with a data expansion process that is related to the data compression process applied in the recording operation; and second reproducing means for reproducing the particular scene division read from the storage means.

14. A recording method as recited by claim 1, wherein a quantity of video data in each scene division of the scene block is inversely related to the number of selectively reproducible scenes included in the particular multi-scene zone.

15. A recording medium as recited by claim 4, where a quantity of video data in each scene division of the scene block is inversely related to the number of selectively reproducible scenes included in the particular multi-scene zone.

16. A reproducing method as recited by claim 6, where a quantity of video data in each scene division of the scene block is inversely related to the number of selectively reproducible scenes included in the particular multi-scene zone.

17. A reproducing apparatus as recited by claim 8, where a quantity of video data in each scene division of the scene block is inversely related to the number of selectively reproducible scenes included in the particular multi-scene zone.

18. A recording method as recited by claim 2, where the prescribed compression process controls the quantity of data in each scene division such that each scene block has less than a prescribed quantity of video data regardless of a number of selectively reproducible scenes included in the particular multi-scene zone.

19. A recording medium as recited by claim 5, where the prescribed compression process controls the quantity of data in each scene division such that each scene block has less than a prescribed quantity of video data regardless of a number of selectively reproducible scenes included in the particular multi-scene zone.

20. A reproducing method as recited by claim 7, where the prescribed compression process controls the quantity of data in each scene division such that each scene block has less than a prescribed quantity of video data regardless of a number of selectively reproducible scenes included in the particular multi-scene zone.

21. A reproducing apparatus as recited by claim 9, where the prescribed compression process controls the quantity of data in each scene division such that each scene block has less than a prescribed quantity of video data regardless of a number of selectively reproducible scenes included in the particular multi-scene zone.

22. A data recording method as recited by claim 2, where the prescribed compression process controls the quantity of data in each scene division such that a quantity of video data in each scene division that has been compressed is inversely related to a number of selectively reproducible scenes being multiplexed.

23. A recording medium as recited by claim 5, where the prescribed compression process controls the quantity of data in each scene division such that a quantity of video data in each scene division that has been compressed is inversely related to a number of selectively reproducible scenes being multiplexed.

24. A reproducing method as recited by claim 7, where the prescribed compression process controls the quantity of data in each scene division such that a quantity of video data in each scene division that has been compressed is inversely related to a number of selectively reproducible scenes being multiplexed.

25. A reproducing apparatus as recited by claim 9, where the prescribed compression process controls the quantity of data in each scene division such that a quantity of video data in each scene division that has been compressed is inversely related to a number of selectively reproducible scenes being multiplexed.

26. A recording method as recited by claim 22, where each scene block has less than a prescribed quantity of video data regardless of the number of selectably reproducible scenes included in the particular multi-scene zone.

27. A recording medium as recited by claim 23, where each scene block has less than a prescribed quantity of video data regardless of the number of selectably reproducible scenes included in the particular multi-scene zone.

28. A reproducing method as recited by claim 24, where each scene block has less than a prescribed quantity of video data regardless of the number of selectably reproducible scenes included in the particular multi-scene zone.

29. A reproducing apparatus as recited by claim 25, each scene block has less than a prescribed quantity of video data regardless of the number of selectably reproducible scenes included in the particular multi-scene zone.

30. A data recording method as recited by claim 1, wherein the scene divisions within each scene block are multiplexed in an order such that the scene division of a default scene is positioned first in each scene block.

31. A data recording method as recited by claim 2, wherein the scene divisions within each scene block are multiplexed in an order such that the scene division of a default scene is positioned first in each scene block.

32. A data recording medium as recited by claim 4, wherein the scene divisions within each scene block are multiplexed in an order such that the scene division of a default scene is positioned first in each scene block.

33. A data recording medium as recited by claim 5, wherein the scene divisions within each scene block are multiplexed in an order such that the scene division of a default scene is positioned first in each scene block.

34. A data reproducing method as recited by claim 6, wherein the scene divisions within each scene block are multiplexed in an order such that the scene division of a default scene is positioned first in each scene block.

35. A data reproducing method as recited by claim 7, wherein the scene divisions within each scene block are multiplexed in an order such that the scene division of a default scene is positioned first in each scene block.

36. A data reproducing apparatus as recited by claim 8, wherein the scene divisions within each scene block are multiplexed in an order such that the scene division of a default scene is positioned first in each scene block.

37. A data reproducing apparatus as recited by claim 9, wherein the scene divisions within each scene block are multiplexed in an order such that the scene division of a default scene is positioned first in each scene block.

38. A data recording method as recited by claim 10, wherein the scene divisions within each scene block are multiplexed in an order such that the scene division of a default scene is positioned first in each scene block.

39. A data recording medium as recited by claim 11, wherein the scene divisions within each scene block are multiplexed in an order such that the scene division of a default scene is positioned first in each scene block.

40. A data reproducing method as recited by claim 12, wherein the scene divisions within each scene block are multiplexed in an order such that the scene division of a default scene is positioned first in each scene block.

41. A data reproducing apparatus as recited by claim 13, wherein the scene divisions within each scene block are multiplexed in an order such that the scene division of a default scene is positioned first in each scene block.

42. A data recording medium as recited by claim 5, where a total data quantity for each scene block is limited to less than a prescribed value by controlling a data compression ratio used in the prescribed compressing process.

43. A data reproducing method for reproducing a video program containing at least one multi-scene zone having a plurality of selectively reproducible scenes from a recording medium, the video program being recorded with each selectively reproducible scene in a particular multi-scene zone being divided into a set of scene divisions, a set of scene blocks being generated based on the scene divisions, each scene block including a corresponding scene division from each selectively reproducible scene within the particular multi-scene zone, the scene divisions within each scene block being multiplexed, data being reproduced from within each scene block at a rate which is less than a prescribed value regardless of the number of selectively reproducible scenes within the particular multi-scene zone, the reproducing method including:

reading a particular scene block from the recording medium;

storing the particular scene block read from the recording medium; and reading and reproducing a scene division from the particular scene block corresponding to a selected one of the selectively reproducible scenes at the rate which is less than the prescribed value.

44. A data reproducing apparatus for reproducing a video program containing at least one multi-scene zone having a plurality of selectively reproducible scenes from a recording medium, the video program being recorded with each selectively reproducible scene in a particular multi-scene zone being divided into a set of scene divisions, a set of scene blocks being generated based on the scene divisions, each scene block including a corresponding scene division from each selectively reproducible scene within the particular multi-scene zone, the scene divisions within each scene block being multiplexed, data being reproduced from within each scene block at a rate which is less than a prescribed value regardless of the number of selectively reproducible scenes within the particular multi-scene zone, the data reproducing apparatus comprising:

first reproducing means for reproducing from the recording medium a particular scene block;

storage means for storing the particular scene block reproduced by the first reproducing means;

reading means for reading and recording a particular scene division corresponding to a selected one of the selectively reproducible scenes from the storage means.

45. A data reproducing method for reproducing a video program containing at least one multi-scene zone having a plurality of selectively reproducible scenes from a recording medium, the video program being recorded with each selectively reproducible scene in a particular multi-scene zone being divided into a set of scene divisions, a set of scene blocks being generated based on the scene divisions, each scene block including a corresponding scene division from each selectively reproducible scene within the particular multi-scene zone, the scene divisions within each scene block being multiplexed, data being reproduced from within each scene block having multiple reproducible scene divisions at a rate which is less than a rate for reproducing data from a scene zone having a single reproducible scene division regardless of the number of selectively reproducible scenes within the particular multi-scene zone, the reproducing method including:

reading a particular scene block from the recording medium;

storing the particular scene block read from the recording medium; and reading and reproducing a scene division from the particular scene block corresponding to a selected one of the selectively reproducible scenes at the rate which is less than the prescribed value.

46. A data reproducing apparatus for reproducing from a recording medium a video program containing at least one multi-scene zone having a plurality of selectively reproducible scenes, the video program being recorded with each selectively reproducible scene in a particular multi-scene zone being divided into a set of scene divisions, a set of scene blocks being generated based on the scene divisions, each scene block including a corresponding scene division from each selectively reproducible scene within the particular multi-scene zone, the scene divisions within each scene block being multiplexed, data being reproduced from within each scene block having multiple reproducible scene divisions at a rate which is less than a rate for reproducing data from a scene zone having a single reproducible scene division regardless of the number of selectively reproducible scenes within the particular multi-scene zone, the data reproducing apparatus comprising:

first reproducing means for reproducing from the recording medium a particular scene block;

storage means for storing the particular scene block reproduced by the first reproducing means;

reading means for reading and recording a particular scene division corresponding to a selected one of the selectively reproducible scenes from the storage means.

* * * * *